No. 897,755. PATENTED SEPT. 1, 1908.
F. MALLOYE.
COMBINATION FRESH AND SALT WATER HYDRANT.
APPLICATION FILED FEB. 18, 1908.

2 SHEETS—SHEET 2.

WITNESSES:

INVENTOR,
Frank Malloye
BY
ATTORNEY.

UNITED STATES PATENT OFFICE.

FRANK MALLOYE, OF SAN FRANCISCO, CALIFORNIA.

COMBINATION FRESH AND SALT WATER HYDRANT.

No. 897,755.   Specification of Letters Patent.   Patented Sept. 1, 1908.

Application filed February 18, 1908. Serial No. 416,577.

*To all whom it may concern:*

Be it known that I, FRANK MALLOYE, a citizen of the United States, residing at San Francisco, in the county of San Francisco and State of California, have invented new and useful Improvements in a Combination Fresh and Salt Water Hydrant, of which the following is a specification.

The object of the present invention is to provide a combination salt and fresh water hydrant, in which nozzles shall be well adapted for the attachment of hose, either for fire purposes or for sprinkling, and in which it shall be impossible for the salt water to leak into the fresh.

Figure 1:
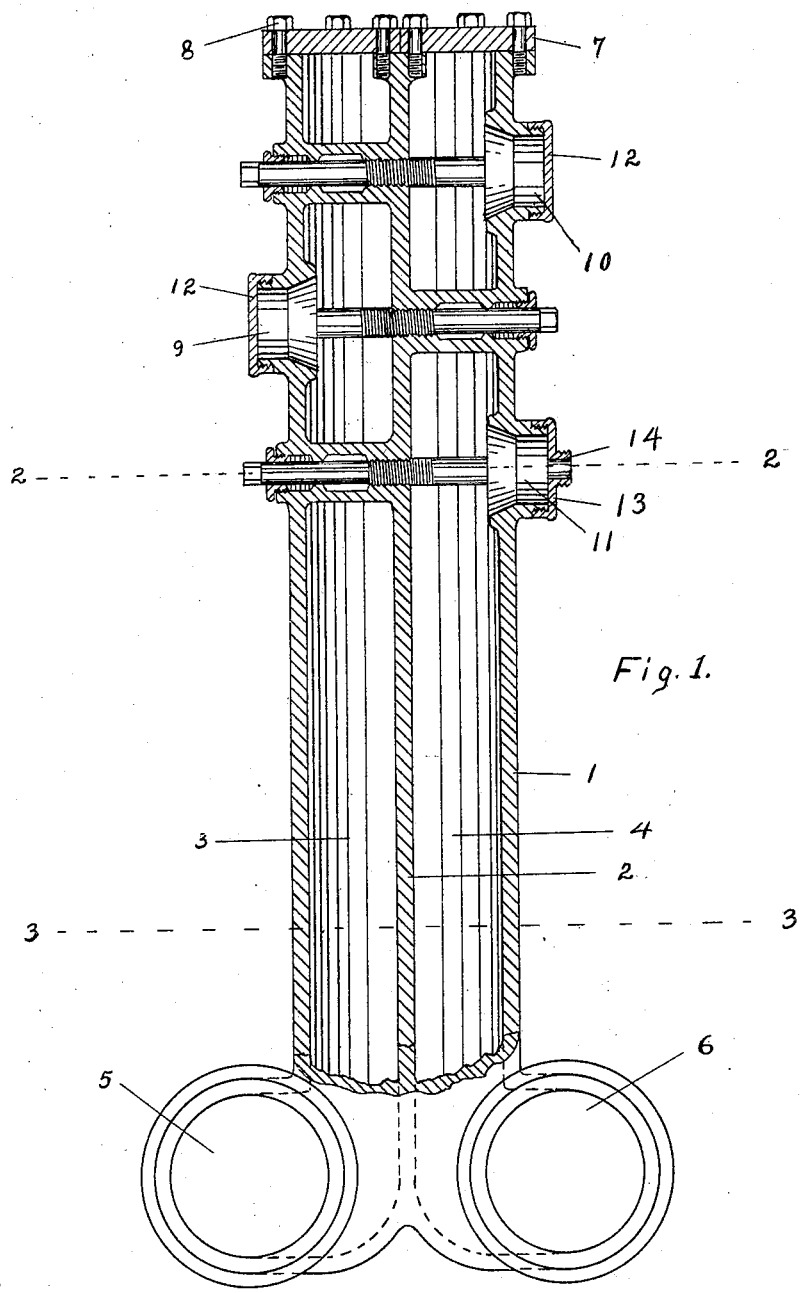
Figure 2:
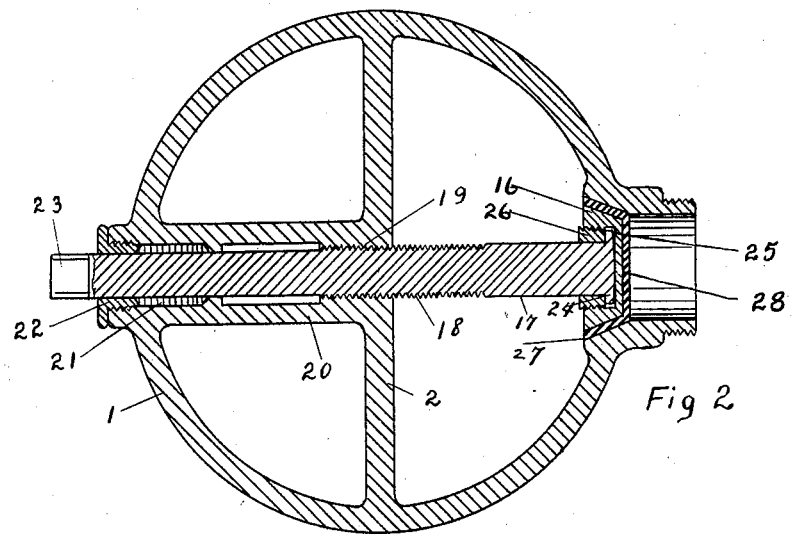
Figure 3:
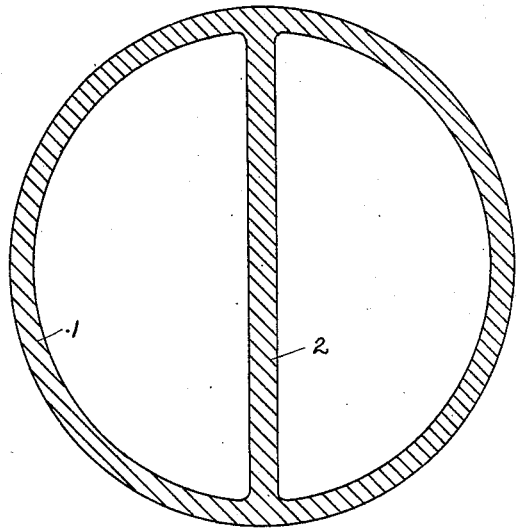

In the accompanying drawing, Figure 1 is a side view, partly in vertical section, of my improved hydrant; Fig. 2 is a cross section thereof, on an enlarged scale, on the line 2—2 of Fig. 1; Fig. 3 is a similar view on the line 3—3 of Fig. 1.

Referring to the drawing, 1 indicates the outer shell of the hydrant, forming a chamber which is divided by a central longitudinal or vertical partition 2 into two compartments 3, 4, having the respective inlets 5, 6, the compartment 3 being intended as a salt water conduit of the hydrant, and the compartment 4 as a fresh water conduit. The hydrant is closed at the top by the cover 7, secured thereto by screws 8.

9 indicates the salt water nozzle and 10, 11, the upper and lower fresh water nozzles. The nozzles 9 and 10 are closed by caps 12, and the nozzle 11 is closed by a cap 13, which latter is formed with a small nozzle 14, the cap for closing which is not shown, which latter nozzle 14 may be attached to a small hose pipe for sprinkling or other purposes.

The escape of water from each of these nozzles is regulated by means of a valve 16. Said valve comprises a stem 17, having a threaded part 18 adapted to screw into a threaded aperture 19, which is formed in the vertical partition 2 and also in a horizontal tubular connection 20 between said partition 2 and the side of the casing 1 of the hydrant remote from the corresponding nozzle. The outer part of said connection is formed with a stuffing box 21, and is closed by a gland 22. The outer end of the stem is suitably conformed as at 23 to enable a wrench applied thereto to turn the valve.

The inner end of the stem is formed with a head 24, which is received in a socket 25 in the valve proper 16, an annular nut 26 around said stem being screwed into said valve 16 to hold the stem in place in said recess. Between the valve 16 and the seat 27 of the valve, is interposed a dish-shaped washer or cover 28, of vulcanized fiber or similar material, adapted to make a tight fit in the valve.

It is very important to prevent leakage of the salt water from the conduit 3 into the fresh water in the conduit 4. To positively insure this prevention, the tubular connections 20 are formed integral both with the outer casing 1 and with the partition 2, which connections completely inclose the stems of the valves, so that, if there should be any leakage between said stems and their bearing, the water so leaking cannot escape into the other conduit. The construction of the valve permits of the use of these tubular sleeves for the valve stems, for it permits of assembling the valve, by, first, passing the stem 17 with the nut 26 thereon, through the nozzle into position in its bearing, then lowering the valve proper 16 and the fiber cover 28 through the top of the hydrant into position in front of the head of the stem, then inserting said head in the recess in said valve, and then screwing the nut into position, holding the head in place in the valve.

By providing means for securing the head in a recess in the valve, it is effected that the valve stem can be turned, to move the valve up to, or away from its seat, without turning the valve in its seat, thus avoiding wear upon the vulcanized fiber cover.

I claim:—

1. A combination salt and fresh water hydrant, comprising a shell or casing, a vertical partition dividing the interior of said casing into two conduits, a nozzle for each conduit, a valve for closing one of said nozzles, having a stem, and a tubular connection formed integral with said partition and casing, through which said stem passes, substantially as described.

2. A combination salt and fresh water hydrant, comprising a shell or casing, a vertical partition dividing the interior of said casing into two conduits, a nozzle for each conduit, a valve for closing one of said nozzles, having a stem, a tubular connection formed integral with said partition and casing, through which said stem passes, a valve proper for closing the latter nozzle, said valve having a recess, and a nut on the stem of the valve and screwed into the valve to hold the end of the stem in said recess, substantially as described.

3. A combination salt and fresh water hydrant, comprising a shell or casing, a vertical partition dividing the interior of said casing into two conduits, a nozzle for each conduit, a valve for closing one of said nozzles, having a stem, a tubular connection formed integral with said partition and casing, through which said stem passes, a valve proper for closing the latter nozzle, said valve having a recess, a nut on the stem of the valve and screwed into the valve to hold the end of the stem in said recess, and a cover of vulcanized fiber between said valve and its seat, substantially as described.

In testimony whereof I have hereunto set my hand in the presence of two subscribing witnesses.

FRANK MALLOYE.

Witnesses:
L. H. BAAR,
M. McGOVERN.